United States Patent [19]
Lee

[11] 3,927,036
[45] Dec. 16, 1975

[54] BASIC CARBONATES AND CARBAMATES OF BENZOPYRANS

[75] Inventor: Cheuk Man Lee, Waukegan, Ill.

[73] Assignee: Abbott Laboratories, North Chicago, Ill.

[22] Filed: May 25, 1972

[21] Appl. No.: 256,954

[52] U.S. Cl............ 260/345.3; 424/283; 260/243 B; 260/293.58; 260/247.2 A; 260/247.2 B; 260/268 TR; 260/326.34
[51] Int. Cl.[2]............... C07D 311/80; C07D 311/94
[58] Field of Search................................. 260/345.3

[56] References Cited
UNITED STATES PATENTS
3,557,150  1/1971  Drummond et al............... 260/345.2
3,728,360  4/1973  Pars et al........................ 260/345.3

*Primary Examiner*—John M. Ford
*Attorney, Agent, or Firm*—Gildo E. Fato; Robert L. Niblack

[57] ABSTRACT

Basic carbonates and carbamates of benzopyrans represented by the formula

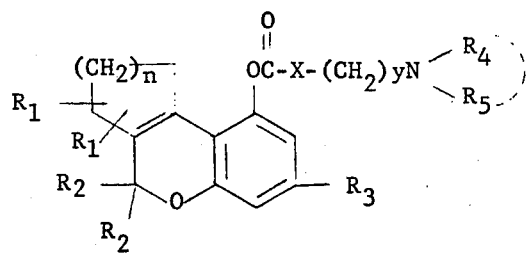

wherein $n$ is 1 or 2; $R_1$ is hydrogen or loweralkyl; $R_2$ is loweralkyl; $R_3$ is alkyl or cycloalkyl; X is O or NH; $y$ is an integer from 2–6; and $R_4$ and $R_5$ each are hydrogen or loweralkyl; or $R_4$ and $R_5$ taken together form a 5- or 6-membered heterocyclic ring and the acid addition salts thereof.

11 Claims, No Drawings

BASIC CARBONATES AND CARBAMATES OF BENZOPYRANS

DETAILED DESCRIPTION OF THE INVENTION

This invention relates to basic carbamates and carbonates of benzopyrans and to methods of making and using the compounds.

The compounds of this invention are represented by the formula

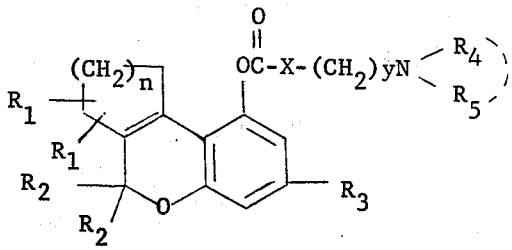

wherein $n$ is 1 or 2; each $R_1$ is hydrogen or loweralkyl; $R_2$ is loweralkyl; $R_3$ is alkyl or cycloalkyl; X is O or NH; $y$ is an integer from 2–6; and $R_4$ and $R_5$ each are hydrogen or loweralkyl; or $R_4$ and $R_5$ taken together from a 5- or 6-membered heterocyclic ring and the acid addition salts thereof.

When $n$ is 1, the compounds are represented by the formula

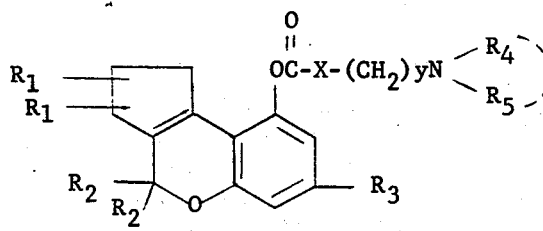

When $n$ is 2, the compounds are represented by the formula

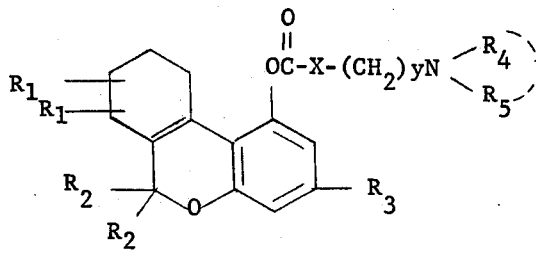

The term "loweralkyl", as used herein, refers to $C_1$-$C_6$ straight and branched chain alkyl radicals including methyl, ethyl n-propyl, iso-propyl, n-butyl, sec-butyl, tert-butyl, n-pentyl, iso-pentyl, neo-pentyl, n-hexyl and the like.

The term "alkyl" refers to $C_1$-$C_{20}$ straight and branched chain alkyl radicals including, for example, methyl, n-pentyl, n-hexyl, 2-heptyl, n-heptyl, 3-methyl-2-octyl, n-octyl, 2-nonyl, 2-tetradecyl, 2-eiconsanyl and the like.

"Cycloalkyl" refers to $C_3$-$C_8$ cycloalkyl or cycloalkylloweralkyl groups such as cyclopropyl, cyclopropylmethyl, cyclobutyl, cyclooctyl and the like.

The term "a 5- or 6-membered heterocyclic ring" includes piperidino, morpholino, thiomorpholino, piperazino, pyrrolidino and the like.

The term "a pharmaceutically acceptable acid addition salt" refers to non-toxic salts prepared, for example, by reacting the basic carbamates or carbonates with an organic or inorganic acid. Representative salts include the hydrochloride, hydrobromide, sulfate, bisulfate, acetate, valerate, oleate, laurate, borate, benzoate, lactate, phosphate, tosylate, citrate, maleate, fumarate, succinate, tartrate and the like.

The compounds of this invention exhibit central nervous system activity and are particularly useful as antianxiety agents at dosages of from 0.5 to 30 mg./kg. of body weight daily. The combination of anti-depressant and transquilizing activity makes the compounds particularly useful in treating depressed patients wherein one of the manifested symptoms of depression is anxiety. The anti-depressant activity was established in the modified dopa test. [Everett, "The Dopa Response Potentiation Test and Its Use In Screening for Antidepressant Drugs," Excerpta Medica International Congress Series No. 122, pp 164–167 (1966)].

In addition to the central nervous system activity, the compounds of this invention exhibit excellent activity as antihypertensive agents at dosages of from 0.1 to 10 mg./kg. of body weight daily. The antihypertensive activity was first established in the spontaneously hypertensive rat procedure, Tabei et al., "Clin. Pharmac. and Therap., 11(2):" 269–274 (1970). Hypertensive patients are often treated both with agents which lower blood pressure and with tranquilizers. The combination of both activities exhibited by the compounds of this invention makes them particularly useful in the management of hypertension.

The compounds also exhibit analgesic activity at dosages of from 40 to 100 mg./kg. of body weight daily. Thus, the compounds are additionally useful in treating the headaches associates with depression and/or hypertension.

Generally speaking, the carbonates of this invention are prepared by reacting the 9- or 1-chlorocarbonyloxy derivative of the corresponding benzopyran with the appropriate alcohol. The carbamates are prepared by reacting the 9- or 1-chlorocarbonyloxy derivative of the corresponding benzopyran with an appropriate dialkylamino (or heterocyclic)alkyl amine. The acid addition salts can be prepared by reacting an organic or inorganic acid with the carbamate or carbonate.

The benzopyran starting compounds can be prepared by several well known routes such as that reported by Adams et al., J. Chem. Soc., 62, 2245 and 2407 (1940) or Mechoulam et al., J. Am. Chem. Soc., 89, 4552 (1967).

The following examples further illustrate this invention.

EXAMPLE 1

9-(Chlorocarbonyloxy)-4,4-dimethyl-7-(3-methyl-2-octyl)-1,2,3,4-tetrahydrocyclopenta[c][1]benzopyran

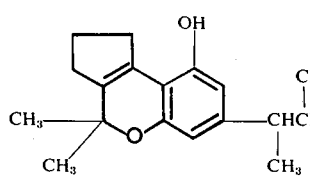 + COCl$_2$ 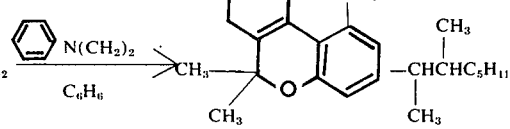

A solution of 3.42 g. (0.01 mole) of 4,4-dimethyl-9-hydroxy-7-(3-methyl-2-octyl)-1,2,3,4-tetrahydrocyclopenta[c][1]benzopyran in 25 ml. of benzene was added dropwise to a stirred solution of 8.7 g. of 12.5% phosgene in benzene (0.011 mole) cooled in an ice bath, followed by dropwise addition of a solution of 1.33 g. (0.011 mole) of N,N-dimethylaniline in 10 ml. of benzene. The mixture was stirred in ice bath temperature for a while, then at room temperature overnight (18 hours). The mixture was heated in an oil bath at 75°–85° for 1 hour and evaporated to dryness in vacuo. The residue was triturated with ether; a solid separated, which was filtered off. The filtrate was evaporated to dryness in vacuo giving 4.5 g. of the crude product as a dark viscous residue.

EXAMPLE 2

1-(Chlorocarbonyloxy)-3-(3-methyl-2-octyl)-6,6,9-trimethyl-7,8,9,10-tetrahydro-6H-dibenzo[b,d]pyran was prepared according to the method of Example 1 from 1-hydroxy-3-(3-methyl-2-octyl)-6,6,9-trimethyl-7,8,9,10-tetrahydro-6H-dibenzo[b,d]pyran.

EXAMPLE 3

9-{[2-(Diethylamino)ethoxy]carbonyloxy}-4,4-dimethyl-7-(3-methyl-2-octyl)-1,2,3,4-tetrahydrocyclopenta[c][1]benzopyran A solution of 4.5 g. of crude 9-(chlorocarbonyloxy)-4,4-dimethyl-7-(3-methyl-2-octyl)-1,2,3,4-tetrahydrocyclopenta[c][1]benzopyran in 30 ml. of benzene was added dropwise to a stirred solution of 2.11 g. of 2-(diethylamino)ethanol in 30 ml. of benzene. The mixture was stirred at room temperature for 16 hours and then refluxed for 8 hours. The mixture was allowed to cool to room temperature and was filtered. The filtrate was evaporated to dryness in vacuo and the residue was purified by chromatography on a 60–100 mesh Florisil activated magnesium silicate column (150 g.). The column was first eluted with chloroform and then with 5% methanol in chloroform to give 1.25 g. of the pure product.

Analysis Calcd. for $C_{30}H_{47}NO_4$: C, 74.18; H, 9.76. Found: C, 74.42; H, 9.73.

EXAMPLE 4

4,4-Dimethyl-9-{N-[3-(dimethylamino)propyl]carbamoyloxy}-7-(3-methyl-2-octyl)-1,2,3,4-tetrahydrocyclopenta[c][1]benzopyran A solution of 3.75 g. of crube 9-(chlorocarbonyloxy)-4,4-dimethyl-7-(3-methyl-2-octyl)-1,2,3,4-tetrahydrocyclopenta[c][1]benzopyran in 30 ml. of benzene was added dropwise to a stirred solution of 1.73 g. of 3-(dimethylamino)propylamine in 30 ml. of benzene. The reaction mixture was cooled in an ice bath during the addition and stirred at room temperature for 18 hours. The mixture was then filtered to remove the resulting solid material. The filtrate was evaporated to dryness in vacuo to give 5.2 g. of dark residue. The residue was chromatographed on a 60–100 mesh Florisil activated magnesium silicate column (150 g.). The column was first eluted with chloroform, followed by 5% methanol in chloroform to give 2.15 g. of the pure product.

Analysis Calcd. for $C_{29}H_{46}N_2O_3$: C, 74.00; H, 9.85; N, 5.95. Found: C, 74.65; H, 10.18; N, 5.70.

EXAMPLE 5

4,4-Dimethyl-9-{N-[3-(1-methyl-4-piperazinyl)-propyl]carbamoyloxy}-7-(3-methyl-2-octyl)-1,2,3,4-tetrahydrocyclopenta[c][1]benzopyran dimaleate, m.p. 191°–192° was prepared according to the method of Example 4, using 3-(1-methyl-4-piperazinyl)propylamine.

Analysis Calcd. for $C_{32}H_{51}N_3O_3 \cdot 2(C_4H_4O_4)$: C, 63.39; H, 7.85 N, 5.54. Found: C, 63.50; H, 7,94; N, 5.49.

EXAMPLE 6

4,4-Dimethyl-9-{[2-(1-methyl-4-piperazinyl)ethoxy]carbonyloxy}-7-(3-methyl-2-octyl)-1,2,3,4-tetrahydrocyclopenta[c][1]benzopyran was prepared according to the method of Example 3 using 2-(1-methyl-3-piperazinyl)ethanol.

Analysis Calcd. for $C_{31}H_{48}N_2O_4$: C, 72.62; H, 9.44; N, 5.46. Found: C, 73.08; H, 9.54; N, 5.22.

EXAMPLE 7

4,4-Dimethyl-9-{[2-(1-methyl-4-piperazinyl)ethoxy]carbonyloxy}-7-(3-methyl-2-octyl)-1,2,3,4-tetrahydrocyclopenta [c][1]benzopyran difumate was prepared by reacting the compound of Example 6 with fumaric acid, m.p. 174°–176°.

Analysis Calcd. for $C_{31}H_{48}N_2O_4 \cdot 2(C_4H_4O_4)$: C, 62.88; H, 7.58; N, 3.77. Found: C, 62.76; H, 7.55; N. 3.77.

EXAMPLE 8

4,4-Dimethyl-9-{N-[3-(morpholino)propyl]carbamoyloxy}-7-(3-methyl-2-octyl)-1,2,3,4-tetrahydrocyclopenta[c][1]benzopyran, was prepared according to the method of Example 4, using 3-(morpholino)propylamine.

Analysis Calcd. for $C_{72.62}; H_{48}N_2O_4$: C, 72..62; H, 9.44; N, 5.46. Found: C, 72.11; H, 9.41; N, 5.39.

EXAMPLE 9

1-{N-[3-(Dimethylamino)propyl]carbamoyloxy}-3-(3-methyl-2-octyl)-6,6,9-trimethyl-7,8,9,10-tetrahydro-6H-dibenzo[b,d]pyran, was prepared according to the method of Example 4 from 1-(chlorocarbonyloxy)-3-(3-methyl-2-octyl)-6,6,9-trimethyl-7,8,9,10-tetrahydro-6H-dibenzo[b,d]pyran and 3-(dimethylamino)propylamine.

The compounds of this invention can be formulated into various pharmaceutically acceptable dosage forms such as tablets, capsules, pills and the like for immediate or sustained releases by combining the active compound with suitable pharmaceutically acceptable carriers or diluents according to methods well-known in the art. Such dosage forms may additionally include excipients, binders, fillers, flavoring and sweetening agents and other therapeutically inert ingredients necessary in the formulation of the desired preparation.

I claim:

1. A compound of the formula

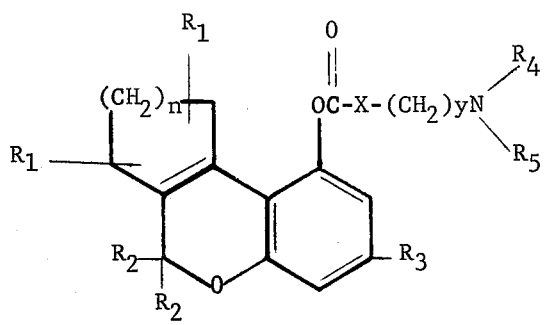

wherein $n$ is 1 or 2; each $R_1$ is hydrogen or loweralkyl; $R_2$ is loweralkyl; $R_3$ is alkyl of from 1 to 20 carbon atoms or cycloalkyl of from 3 to 8 carbon atoms; X is O or NH; $y$ is an integer from 2–6; and $R_4$ and $R_5$ each are hydrogen or loweralkyl, or a pharmaceutically acceptable acid addition salt thereof.

2. A compound in accordance with claim 1 wherein n is 1 and the compound is represented by the formula

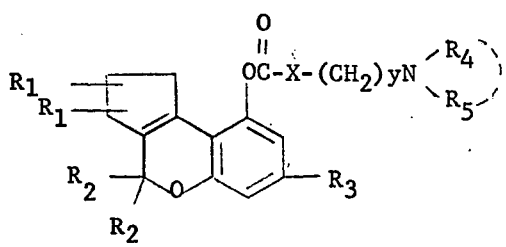

3. A compound in accordance with claim 2 wherein X is NH.

4. A compound in accordance with claim 3: 4,4-dimethyl-9-{N-[3-(dimethylamino)propyl]carbamoyloxy}-7-(3-methyl-2-octyl)-1,2,3,4-tetrahydrocyclopenta[c][1]benzopyran.

5. A compound in accordance with claim 2 wherein X is O.

6. A compound in accordance with claim 5: 9-{[2-(diethylamino)ethoxy]carbonyloxy}-4,4-dimethyl-7-(3-methyl-2-octyl)-1,2,3,4-tetrahydrocyclopenta[c][1]benzopyran or a pharmaceutically acceptable acid addition salt thereof.

7. A compound in accordance with claim 1 wherein n is 2 and the compound is represented by the formula

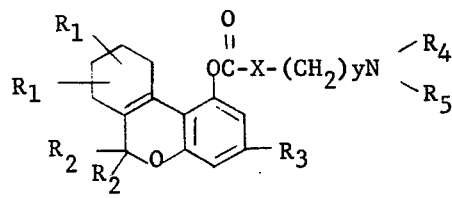

8. A compound in accordance with claim 7 of the formula

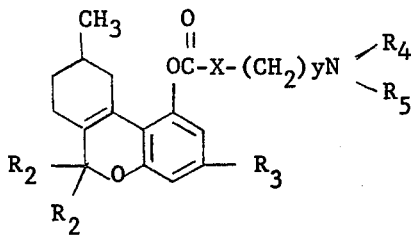

9. A compound in accordance with claim 8 wherein X is NH.

10. A compound in accordance with claim 9: 1-{N-[3-(dimethylamino)propyl]carbamoyloxy}-3-(3-methyl-2-octyl)-6,6,9-trimethyl-7,8,9,10-tetrahydro-6H-dibenzo[b,d]pyran or a pharmaceutically acceptable acid addition salt thereof.

11. A compound in accordance with claim 10 wherein X is O.

* * * * *